United States Patent

Stellini

[11] Patent Number: 5,912,067
[45] Date of Patent: Jun. 15, 1999

[54] FABRIC PARTICULARLY FOR MATTRESSES AND COVERS

[75] Inventor: Renzo Stellini, Vanzaghello, Italy

[73] Assignee: Astral International S.A., Luxembourg

[21] Appl. No.: 08/819,300

[22] Filed: Mar. 18, 1997

[51] Int. Cl.⁶ .................................................. B32B 3/00
[52] U.S. Cl. .......................... 428/196; 442/76; 442/171
[58] Field of Search ........................... 428/196; 442/76, 442/171

[56] References Cited

U.S. PATENT DOCUMENTS

| | | | |
|---|---|---|---|
| 2,704,730 | 3/1955 | Glatt | 428/196 |
| 2,777,779 | 1/1957 | Harwood et al. | 428/196 |
| 3,369,957 | 2/1968 | Carosilli et al. | 428/196 |
| 3,442,736 | 5/1969 | Duns | 428/196 |
| 4,355,065 | 10/1982 | DeMott | 428/196 |
| 4,731,274 | 3/1988 | Ishida et al. | 428/196 |

Primary Examiner—Terrel Morris
Attorney, Agent, or Firm—Jacobson & Johnson

[57] ABSTRACT

An improved textile material wherein only a portion of the visible part of the thread has a thermoplastic resin connecting layer, made integral with the thread, the weft threads of the fabric according to the invention being made of thermoplastic resin and having, on one side of the fabric, a portion of the visible part made integral with a thin layer to a second resin having a softening point proximate to the resin of the weft threads.

7 Claims, 1 Drawing Sheet

FABRIC PARTICULARLY FOR MATTRESSES AND COVERS

BACKGROUND OF THE INVENTION

The present invention relates to an improved fabric, particularly suitable for mattresses and covers.

More particularly, the present invention relates to a fabric for covering synthetic material mattresses having high aesthetic characteristics and mechanical strength.

Conventionally, fabrics are hot- or cold-treated in order to give them particular strength characteristics, said fabrics being combined with materials of a different nature to give them an improved appearance.

The plasticized fabrics of the prior art consist of cotton fibres upon which a continuous layer of plastic material is laid.

This fabric is obtained by spreading and drying one or more vinyl resins thinned with solvents, thus realizing a vinyl material layer, strongly bonded to the fibres of the treated fabric.

The fabric plasticized with vinyl resins has a continuous layer of vinyl resin on the treated surface which makes it substantially waterproof.

This fabric has the fibre meshes occluded by resin and therefore it is not considered suitable for those uses where good transpiration characteristics are required.

Prior art fabrics having a plastic material lamina have a rough hand which is scarcely pleasant to the touch and an appearance that discloses the synthetic material covering, thus making the fabric hardly pleasant from an aesthetic point of view.

In addition, it was noted that the plasticized fabrics of the prior art entail further drawbacks resulting from a decreased resistance to fraying at the hems, or when they are particularly resistant, they have a high stiffening degree due to the presence of a thick covering in synthetic material.

Moreover, the materials currently in use for covering mattresses have fire-proof features not fully satisfactory in that the fire-proof substances tend to evaporate on coming into contact with liquids, thus developing noxious vapors.

U.S. Pat. No. 2,625,499 discloses a surfaced fabric having a thermoplastic surfacing resin which covers the face of the fabric and penetrates the interstices between the yarns and an impregnating resin which penetrates the yarns throughout the fabric, as well as said interstices, whereby the yarns of the fabric are held from substantial relative lateral slippage and separation of the surfacing resin from the body of the fabric is resisted.

The disclosed surfaced fabric has the drawback that the resins form a continuous layer over the face of the fabric and penetrate between the interstices formed by the yarns of the fabric, thus making the tissue waterproof.

On the other hand, not-impregnated tissues are not adapted as coverings for mattresses due to their lack of strength in comparison to an impregnated fabric.

SUMMARY OF THE INVENTION

It is an object of the present invention to provide an improved textile material having remarkable mechanical strength and improved resistance to perforation.

It is another object of the present invention to provide a textile material particularly adapted for mattresses having improved strength, a pleasant aesthetic appearance and being pleasant at touch.

It is yet another object of the invention to provide an improved fabric made of synthetic fibers particularly adapted for coverings, which allows transpiration and has good fire-retardant features.

In accordance with a first aspect of the present invention, there is provided an improved woven fabric comprising:

a plurality of interwoven threads which form the fabric, a surface portion, and a thermoplastic resin layer partially covering selected portions of said threads at said surface portion.

In accordance with a feature of the invention, said selected portions are arranged at intersection areas of said threads and advantageously said thermoplastic resin layer partially impregnates said threads at said selected portions.

In accordance with another feature, the improved woven fabric according to the invention comprises a plurality of interstices, said interstices being only partially obstructed by said thermoplastic resin layer, thus allowing the air to flow.

In accordance with a further feature of the invention, the threads of the woven fabric of the invention are made of a thermoplastic resin such as polyester and polypropylene.

In accordance to yet another feature of the invention, said thermoplastic resin layer (coating) consists of polyethylene, is preferably transparent polyethylene and is more preferably of the fire-retardant type.

In accordance to another aspect of the present invention there is provided a synthetic improved woven fabric having:

a plurality of weft threads made of a first thermoplastic resin, a plurality of warp threads made of a second thermoplastic resin with a softening point greater than that of said first thermoplastic resin, said threads being interwoven to form the fabric;

a surface portion of said weft threads; and a layer made of a third thermoplastic resin partially covering selected portions of the weft threads at said surface portion, wherein said third thermoplastic resin has a softening point proximate to that of said first resin.

BRIEF DESCRIPTION OF THE DRAWINGS

The features of the invention, together with further objects and advantages will better appear from the following description of specific embodiments thereof, when read in connection with the accompanying drawings, wherein.

DESCRIPTION OF THE PREFERRED EMBODIMENTS

Figure 1:
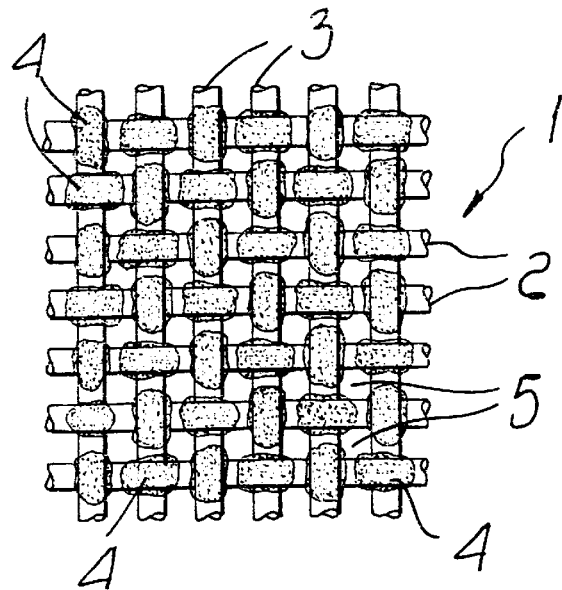
FIG. 1 is an enlarged plan view of the improved woven fabric according to the present invention.

Referring to the drawings and particularly to FIG. 1, there is shown a woven fabric 1 according to the invention, having a plurality of threads 2, 3 interwoven and a thermoplastic resin layer 4 partially covering selected portions of said threads 2, 3.

As shown in FIG. 1, said selected portions are advantageously arranged at intersection areas of the threads 2, 3 of the fabric 1. Thus, the resulting woven fabric 1 is advantageously covered with thermoplastic layers 4, only at portions of the surface of the threads.

Since the interstices 5 of the improved woven fabric 1 are only partially obstructed by the thermoplastic resin layer, a flow of air is permitted. This gives the woven fabric 1 of the invention a perspirant feature.

The woven fabric 1 of the present embodiment is made of natural fibers such as cotton or viscose or, as an alternative, of synthetic fibers such as polyester and polypropylene.

When a natural fiber is used for the threads, the layer 4 of thermoplastic material covers the surface of the threads 2, 3 and partially penetrates between the individual filaments of the cotton threads.

In accordance with a preferred embodiment, the threads 2, 3 of the woven fabric 1 are made of a synthetic resin and a partial interdiffusion between the synthetic material of the threads 2, 3 and the resin of the layer 4 takes place.

It will therefore be understood that the layer 4 can be made of a thermoplastic resin of any type. A particularly preferred thermoplastic resin is polyethylene.

The thermoplastic layer 4 is advantageously provided at discrete portions of the visible part (surface) of the threads and has a thickness of 0.005 to 0.05 mm, preferably of 0.01 to 0.4 mm, more preferably of 0.02 to 0.03 mm.

Referring back to FIG. 1, the interstices 5 between the threads 2, 3 of the woven fabric 1 are only partially obstructed by the thermoplastic resin layer, thus allowing air to flow. This feature allows an effective transpiration which makes the improved woven fabric of the invention particularly suitable as a covering for mattresses.

Figure 2:
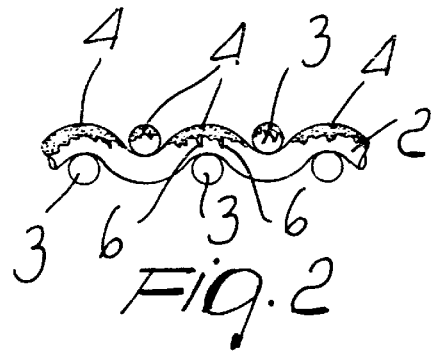
FIG. 2 is an enlarged cross-sectional view of FIG. 1 showing in details that a thermoplastic resin layer covers selected portions of the threads of the improved woven fabric of the present invention, only at selected portions.

FIG. 2 shows in details weft and warp threads of the woven fabric 1, in which a thermoplastic layer covers selected portions of said threads, at surface portions.

Said thermoplastic resin layer 4 partially penetrates between the filaments (not shown).

The thermoplastic resin layer 4 is preferably made of polyethylene and has a thickness of 0.005 to 0.05 mm which makes it not perceptible to the human eye.

Since only selected portions of the surface of the threads have been provided with the thermoplastic resin layer 4, the resulting woven fabric 1 maintains good flexibility features together with an improved strength.

As shown, in the woven fabric according to the present embodiment the thermoplastic resin layer is provided only on the upper side of the visible part of the threads. One of the characterizing features of the improved woven fabric of the invention consists in that only the portions of the visible part of the weft are coated by a thermoplastic resin layer, thus avoiding the formation of a continuous film over the face of the fabric.

Figure 3:
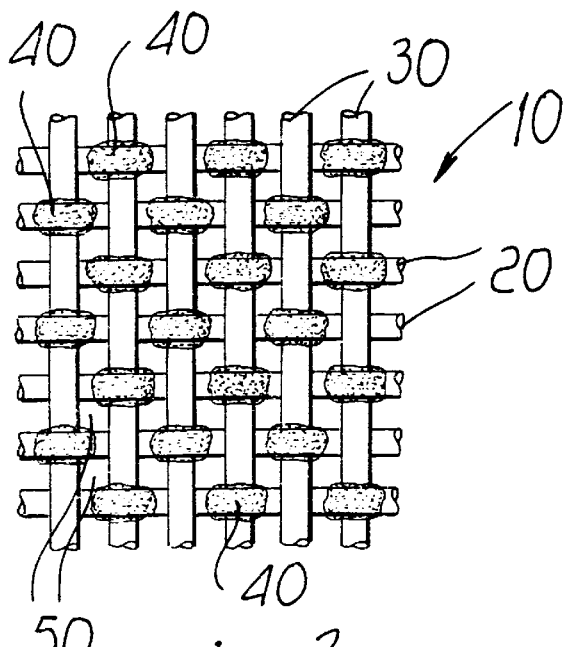
FIG. 3 is an enlarged elevational view of a preferred embodiment of the woven fabric according to the present invention, in which only the visible portion of the weft threads is covered by a thermoplastic resin layer.

FIG. 3 shows a preferred embodiment of a woven fabric 10 of the invention in which the threads 20, 30 are made of a thermoplastic resin.

The illustrated woven fabric 10 comprises a plurality of weft threads 20 made of a first thermoplastic resin, and a plurality of warp threads 30 made of a second thermoplastic resin having a softening point greater than that of said first thermoplastic resin. A layer 40 made of a third thermoplastic resin partially covers selected portions of the weft threads 20 at surface portions.

In accordance with a feature of the present embodiment, said third thermoplastic resin has a softening point proximate to the softening point of said first resin. When this condition is met, the thermoplastic resin layer or coating 40 partially impregnates the body of the weft threads 20, and advantageously an interdiffusion between said first resin (resin of the threads) and said third resin (resin of the superimposed layer 40) has taken place.

The layer 40 has a thickness of 0.005 to 0.05 mm, preferably of ca. 0.01 mm, and more preferably it is made of a thermoplastic material (third resin) such as polyethylene which, at this range of thickness, is transparent.

According to a preferred feature of the present embodiment, said second resin (resin of the warp threads 30) has a softening point greater than said first resin (resin of the weft threads 20). In particular, the softening point of the resin of the warp yarns (second resin) is greater than 10° C., preferably greater than 15° C., more preferably greater than 250° C. with respect to the softening point of the resin of the weft threads (first resin).

In accordance with another feature, the weft threads 20 of the improved woven fabric of the invention are made of polypropylene and the thermoplastic resin layer 40, which covers the weft threads 20, consists of polyethylene.

In accordance to yet another feature of the present embodiment, the polypropylene of the weft threads 20 and the polyethylene of the layer 40 have softening points comprised in the range of 10° C., preferably of 7° C. and more preferably of 5° C.

When the polyethylene of the layer 40 is of the fire-retardant type, a woven fabric 10 with remarkable fire-retardant features is provided.

The resulting woven fabric has excellent self-extinguishing properties, in case of fire, which make it particularly suitable for those applications, such as the manufacture of mattresses, in which statutory provisions prescribe non-flammability of the material being used.

Figure 4:
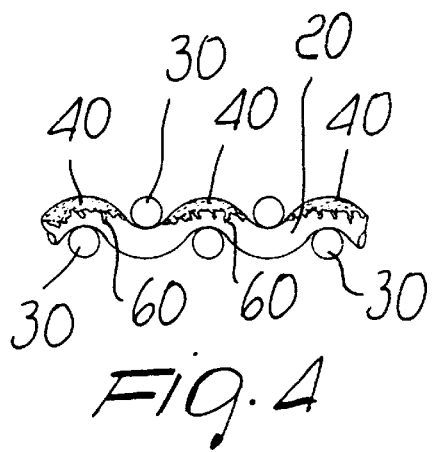
FIG. 4 is an enlarged cross-sectional view of the embodiment of FIG. 3, showing that the thermoplastic resin layer (coating) partially impregnates the body of the weft yarns.

FIG. 4 shows, in detail, the warp threads 30 and a weft thread 20 of the woven fabric 10 of FIG. 3. The weft thread 20, which is preferably made of polypropylene, has portions of the visible part (upper surface) made integral with a thermoplastic resin layer 40, preferably consisting of polyethylene.

In the present embodiment the warp threads 30 are advantageously made of an uncovered thermoplastic material having a softening point greater than that of the resin of the weft threads (as previously disclosed) and preferably consisting of polyester.

Advantageously, an interdiffusion between the resin (polypropylene) of the weft thread 20 and the resin (polyethylene) of the coating 40 has taken place.

As shown in FIG. 4, some branches 60 of the thermoplastic layer 40 (polyethylene) partly impregnate the body of the weft thread 20.

The woven fabric according to the invention has an improved strength as well as a remarkable aesthetic effect since the thermoplastic resin layer provides for a particularly luminous effect.

The improved woven fabric according to the present invention is advantageously obtained by subjecting a woven fabric and a thermoplastic resin film to a concurrent heating and pressure treatment.

The heat treatment is performed at a temperature that can vary depending on the type and thickness of the thermoplastic resin film to be used.

The film of thermoplastic resin has a thickness of 0.005 to 0.05 mm, preferably of 0.01 to 0.02 mm.

The heat treatment (process of manufacture) comprises a step in which the thin thermoplastic film is pressed against the woven fabric under heating, by means of an adapted apparatus. The thermoplastic film is so thin that it provides for a thermoplastic coating located only at surface portions of selected parts (i.e. visible parts) of the fabric threads.

Said selected parts are advantageously arranged at intersection areas of the fabric threads.

The apparatus used in the method of treatment is composed of two calenders arranged so that their axes are mutually parallel and face each other. The two calenders are actuated with a rotary motion about their respective axes and with opposite rotational directions, so as to achieve the traction of the woven fabric and of the thermoplastic layer which are fed from corresponding winding rolls and are inserted between the two calenders.

The calender which comes into contact with the thermoplastic film is heated at a temperature selected in order to achieve the softening of said film.

A device that spreads a lubricant or a non-sticking agent such as silicone oil, is provided on the side of the thermoplastic resin that comes into contact with the heated roller, in order to prevent the resin from adhering to the skirt of the heated calender.

The two rollers are pressed against each other, with a preset pressure so that the thermoplastic layer impregnates the surface of the woven fabric.

The thermoplastic resin is heated, by the heated calender, at a temperature proximate to its softening point and at the same time pressed against the woven fabric so as to give a superimposed layer, thus achieving a partial penetration of the thermoplastic film in the inner layers of the threads.

The weft threads are made of a natural material such as cotton, viscose, cellulose derivatives, or, as an alternative, of a thermoplastic resin having a softening point lower than that of the thermoplastic resins of the warp threads.

In accordance with a preferred embodiment, a method of treatment of woven fabric having weft threads made of polypropylene and warp threads made of polyester is provided, in which a thermoplastic resin layer made of polyethylene is made integral only with portions of the surface of the weft threads.

The polyethylene and polypropylene used in this preferred embodiment have proximate softening points, as previously described. Polyethylene and polypropylene resins having softening points lower than the softening point of polyester are particularly preferred.

The selected application of a thin layer of polyethylene at intersections areas of the threads is achieved by softening the polypropylene of the weft threads and by simultaneously applying under pressure a softened film of polyethylene.

The film of polyethylene has a thickness that is selected to provide a particularly limited amount of polyethylene which adheres only at the softened intersection areas of the interwoven threads.

The thickness of the polyethylene film is selected from 0.005 to 0.05 mm and is preferably of 0.01 mm.

Adhesion shall be highly effective when the softened polyethylene of the film is pressed against the softened polypropylene of the weft threads. Under these preferred conditions, an interdiffusion between the polyethylene and the polypropylene takes place, which provides for a highly effective bound of the superimposed layer to the weft threads.

When the polyethylene used in the performance of the method of treatment is of the flame-retardant type, the resulting woven fabric has remarkable fire-retardant features, thus avoiding the use of soluble or volatile chemicals, when carrying out the method of manufacture.

What is claimed is:

1. A synthetic improved woven fabric having:

a plurality of weft threads made of a first thermoplastic resin, a plurality of warp threads made of a second thermoplastic resin with a softening point greater than that of said first thermoplastic resin, said treads being interwoven to form the fabric, surface portions of said weft threads forming the fabric, and a layer made of a third thermoplastic resin partially covering selected portions of the weft treads at said surface portions, wherein said third thermoplastic resin has a softening point proximate to that of said first resin.

2. An improved woven fabric according to claim 1, wherein said selected portions are arranged at intersection areas of said weft threads with said warp threads.

3. An improved woven fabric according to claim 1, wherein said third thermoplastic resin layer partially impregnates said first thermoplastic resin at said selected portions.

4. An improved woven fabric according to claim 1, wherein said first thermoplastic resin consists of polypropylene and said third thermoplastic resin consists of polyethylene.

5. An improved woven fabric according to claim 1, further comprising an interdiffusion between said polyethylene and said polypropylene.

6. An improved woven fabric according to claim 1, wherein said second thermoplastic resin consists of polyester.

7. An improved woven fabric according to claim 1, wherein said polyethylene has a softening point which is proximate of 10° C. to the softening point of said polypropylene.

* * * * *